(12) United States Patent
Willis

(10) Patent No.: US 9,493,195 B1
(45) Date of Patent: Nov. 15, 2016

(54) SYSTEMS, DEVICES, AND METHODS FOR EXTENDING A FLOOR

(71) Applicant: Matthew Alan Willis, Gladys, VA (US)

(72) Inventor: Matthew Alan Willis, Gladys, VA (US)

(*) Notice: Subject to any disclaimer, the term of this patent is extended or adjusted under 35 U.S.C. 154(b) by 17 days.

(21) Appl. No.: 14/643,314

(22) Filed: Mar. 10, 2015

Related U.S. Application Data

(60) Provisional application No. 61/950,995, filed on Mar. 11, 2014, provisional application No. 62/130,145, filed on Mar. 9, 2015.

(51) Int. Cl.
| | | |
|---|---|---|
| *B60P 3/00* | (2006.01) | |
| *B62D 33/08* | (2006.01) | |
| *B62D 63/06* | (2006.01) | |
| *B62D 25/20* | (2006.01) | |

(52) U.S. Cl.
CPC ............. *B62D 33/08* (2013.01); *B62D 25/20* (2013.01); *B62D 63/061* (2013.01)

(58) Field of Classification Search
CPC ..... B62D 33/08; B62D 25/20; B62D 63/061
See application file for complete search history.

(56) References Cited

U.S. PATENT DOCUMENTS

| | | |
|---|---|---|
| 3,838,868 A | 10/1974 | Robertson |
| 4,141,568 A | 2/1979 | Donnelly |
| 4,786,073 A | 11/1988 | Harper |
| 7,810,834 B2 | 10/2010 | Schneider |
| 7,967,356 B2 | 6/2011 | Stackpole |
| 2004/0061313 A1 | 4/2004 | Courtney |
| 2006/0119080 A1 | 6/2006 | Damron |
| 2010/0090502 A1* | 4/2010 | Mercurio ............. B60R 13/013 296/193.07 |
| 2011/0187178 A1* | 8/2011 | King ..................... B62D 25/20 298/17 R |

* cited by examiner

*Primary Examiner* — Lori L Lyjak
(74) *Attorney, Agent, or Firm* — Michael Haynes PLC; Michael N. Haynes

(57) ABSTRACT

A system, machine, device, and/or manufacture that is configured for, relates to, and/or results from, and/or a method for activities that can comprise and/or relate to, extending a floor, such as a floor of deck, patio, platform, and/or a vehicle, such as a trailer and/or truck from a compressed arrangement to an extended arrangement.

23 Claims, 10 Drawing Sheets

1000

1000

1000

1000

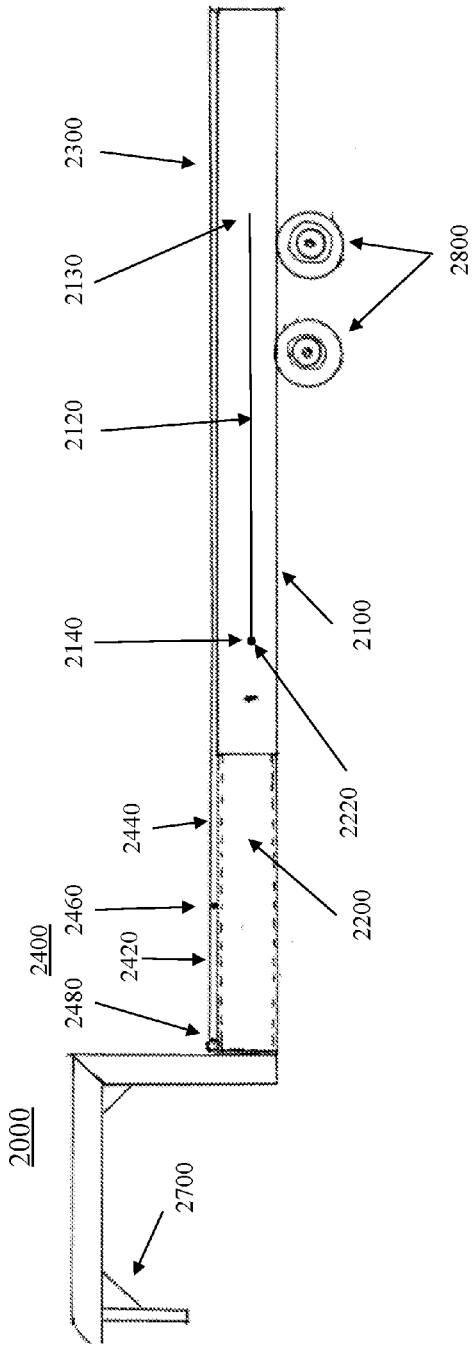
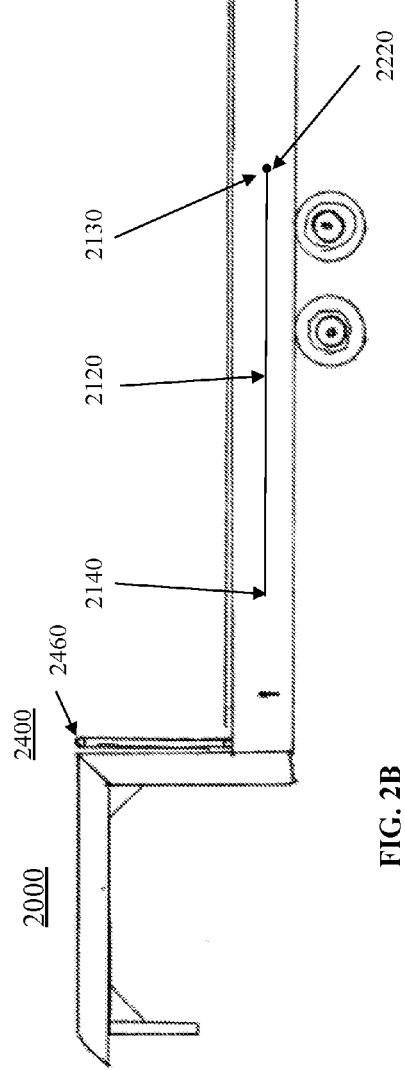
FIG. 2A
FIG. 2B

3000

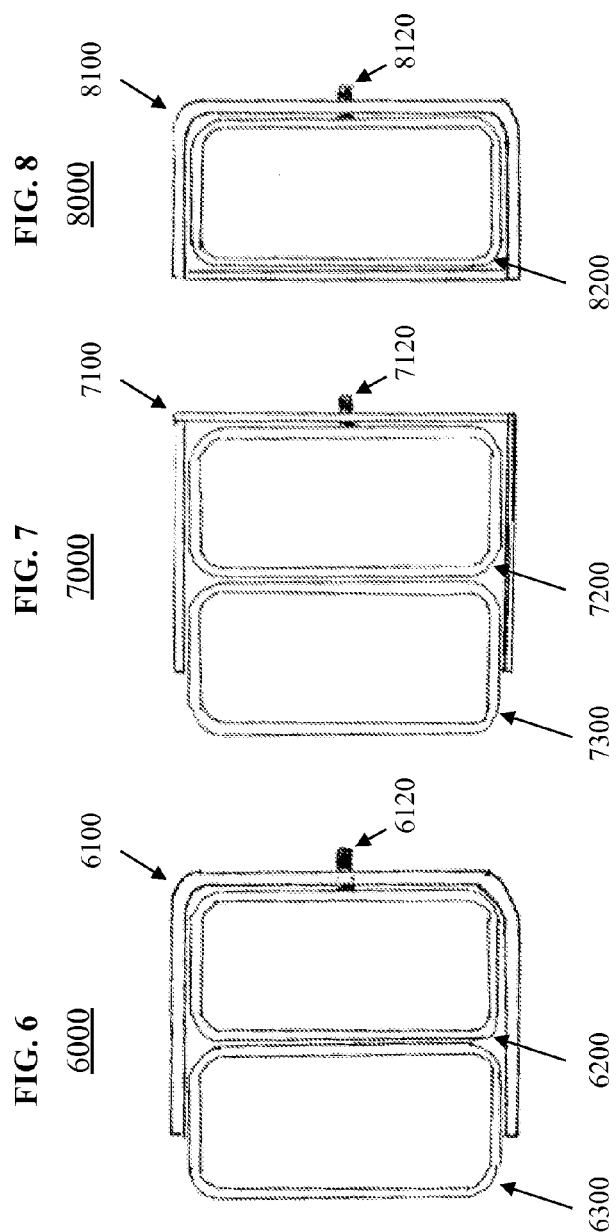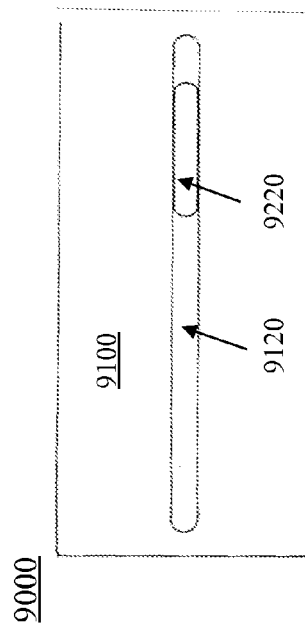

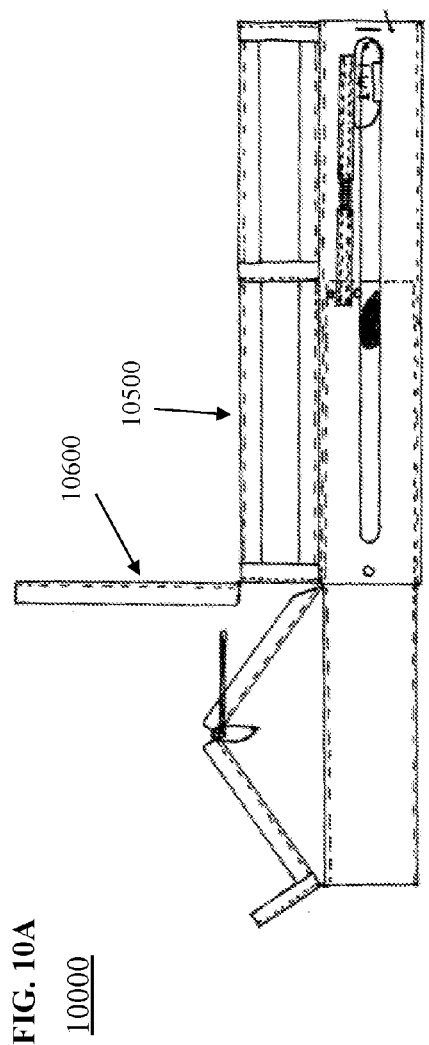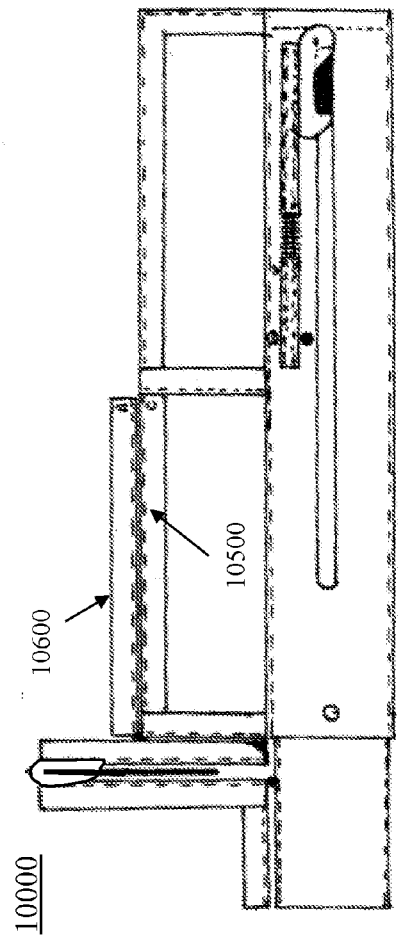
FIG. 10A
FIG. 10B

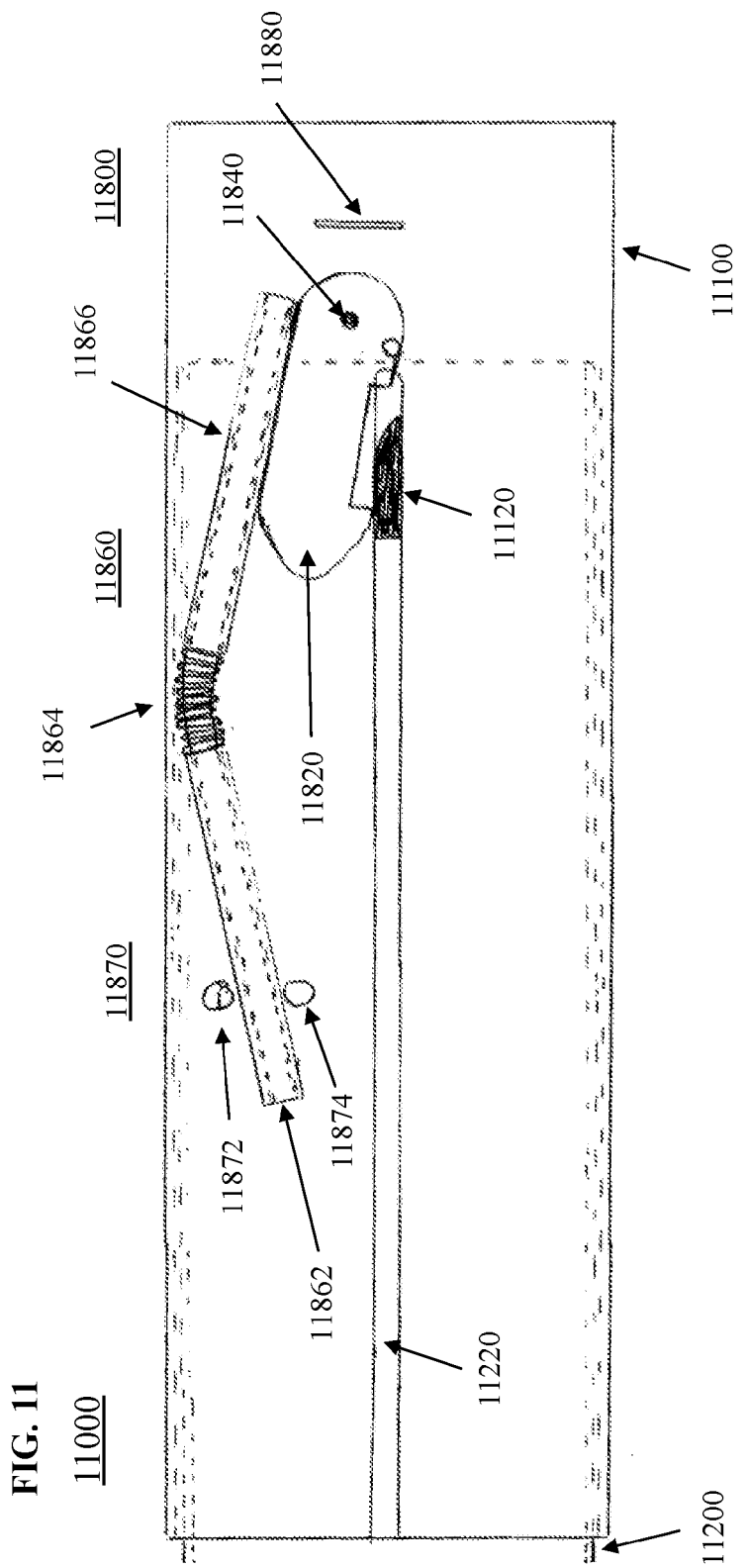

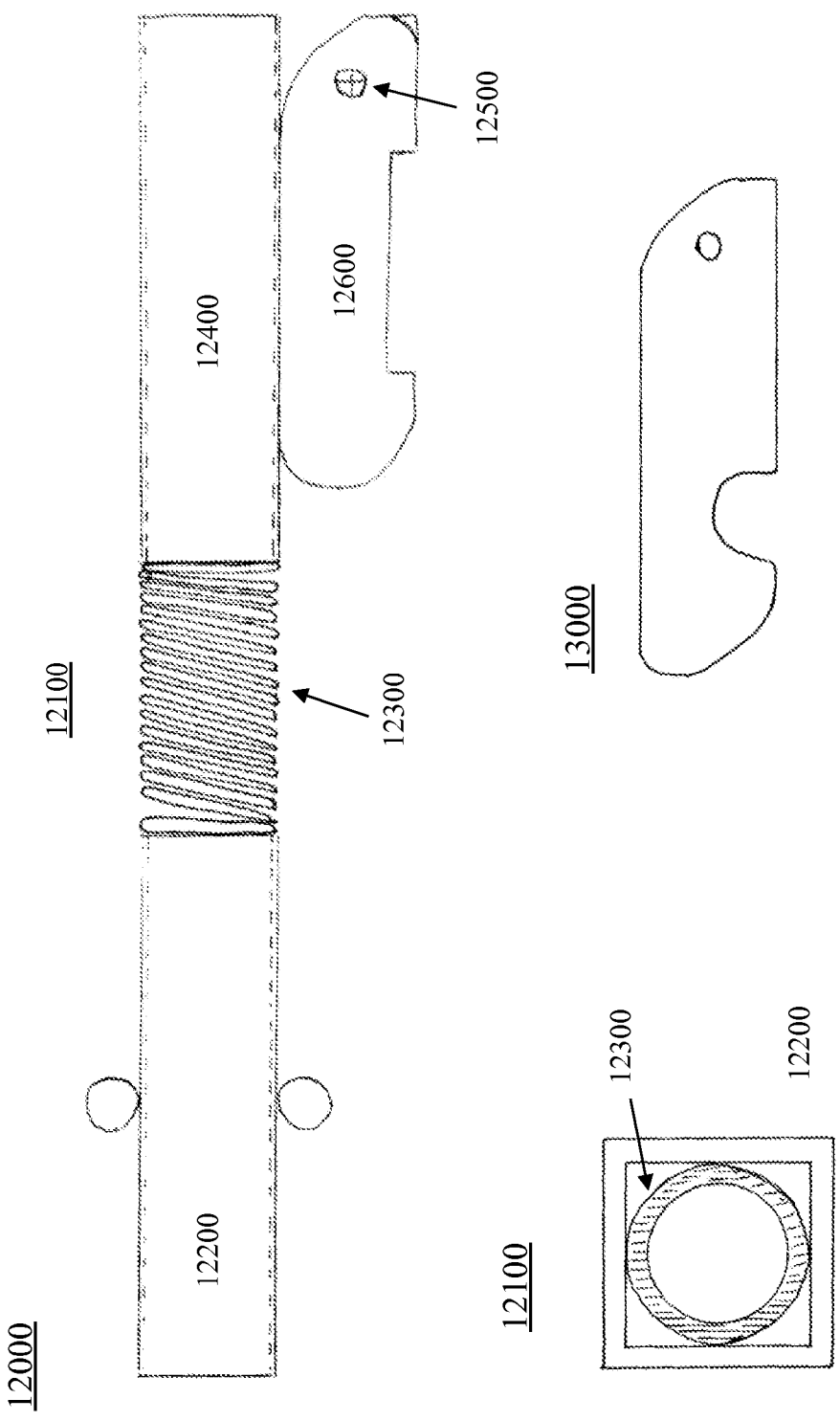

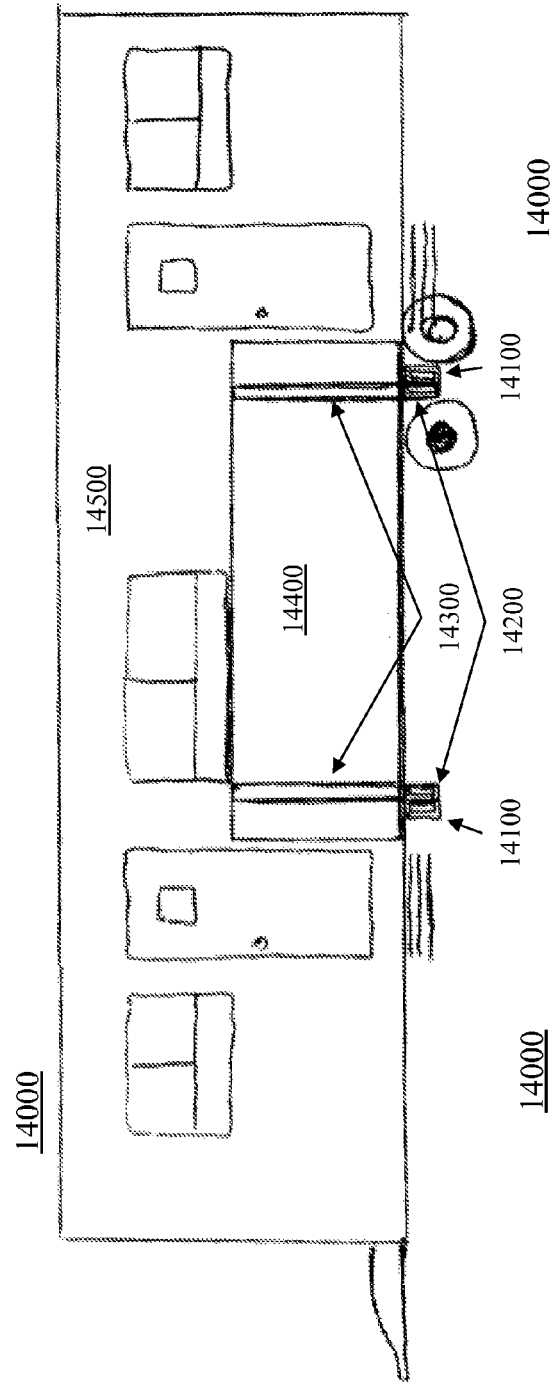
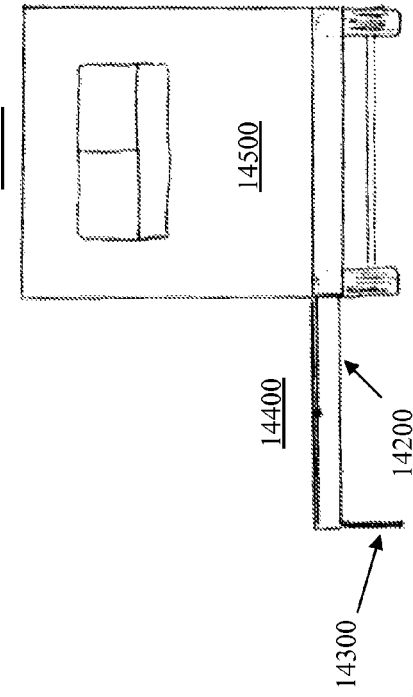
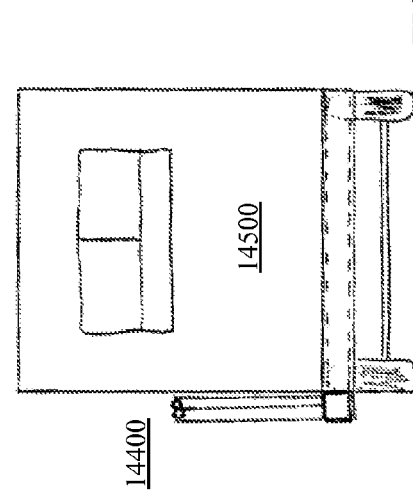
FIG. 14A
FIG. 14B
FIG. 14C

SYSTEMS, DEVICES, AND METHODS FOR EXTENDING A FLOOR

CROSS-REFERENCES TO RELATED APPLICATIONS

This application claims priority to, and incorporates by reference herein in its entirety, U.S. Provisional Patent Applications 61/950,995, filed 11 Mar. 2014, and 62/130,145, filed 9 Mar. 2015.

BRIEF DESCRIPTION OF THE DRAWINGS

A wide variety of potential, feasible, and/or useful embodiments will be more readily understood through the herein-provided, non-limiting, non-exhaustive description of certain exemplary embodiments, with reference to the accompanying exemplary drawings in which:

FIG. 2A is a side view of an exemplary embodiment of a machine 2000 in an extended arrangement;

FIG. 2B is a side view of an exemplary embodiment of a machine 2000 in a compressed arrangement;

FIG. 6 is an end view of an exemplary embodiment of an assembly 6000;

FIG. 7 is an end view of an exemplary embodiment of an assembly 7000;

FIG. 8 is an end view of an exemplary embodiment of an assembly 8000;

FIG. 9 is a side view of an exemplary embodiment of an assembly 9000;

FIG. 10A is a side view of an exemplary embodiment of a machine 10000 in between a compressed arrangement and an extended arrangement;

FIG. 10B is a side view of an exemplary embodiment of a machine 10000 in a compressed arrangement;

FIG. 11 is a side view of an exemplary embodiment of an assembly 11000;

FIG. 12A is a side view of an exemplary embodiment of an assembly 12000;

FIG. 12B is an end view of an exemplary embodiment of an assembly 12100;

FIG. 13 is a side view of an exemplary embodiment of a device 13000;

FIG. 14A is a side view of an exemplary embodiment of a machine 14000 in a compressed arrangement;

FIG. 14B is a end view of an exemplary embodiment of a machine 14000 in a compressed arrangement; an FIG. 14C is a end view of an exemplary embodiment of a machine 14000 in an extended arrangement.

DESCRIPTION

Figure 1A:
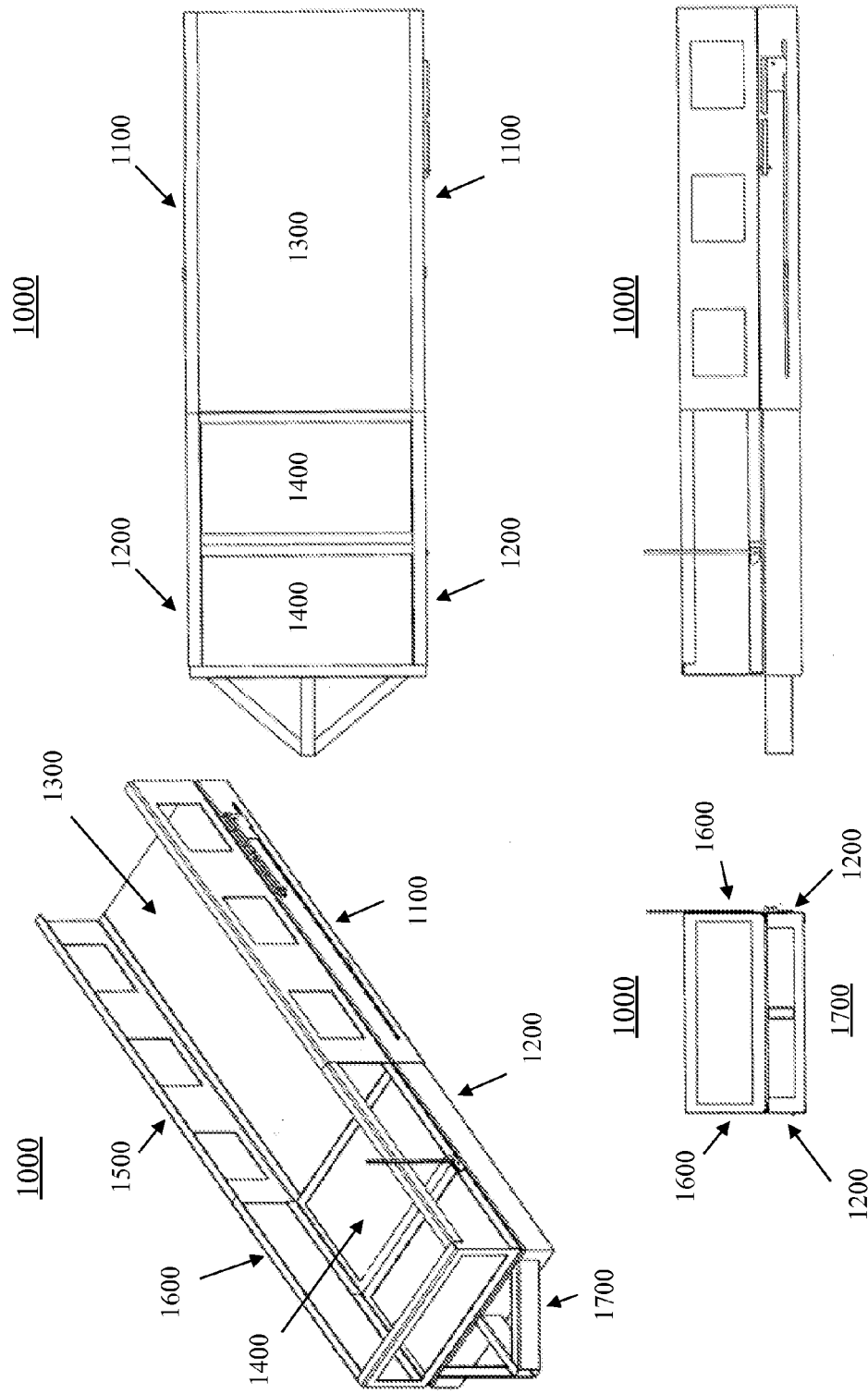
FIG. 1A is a perspective view of an exemplary embodiment of a machine 1000 in an extended arrangement.
Figure 1B:
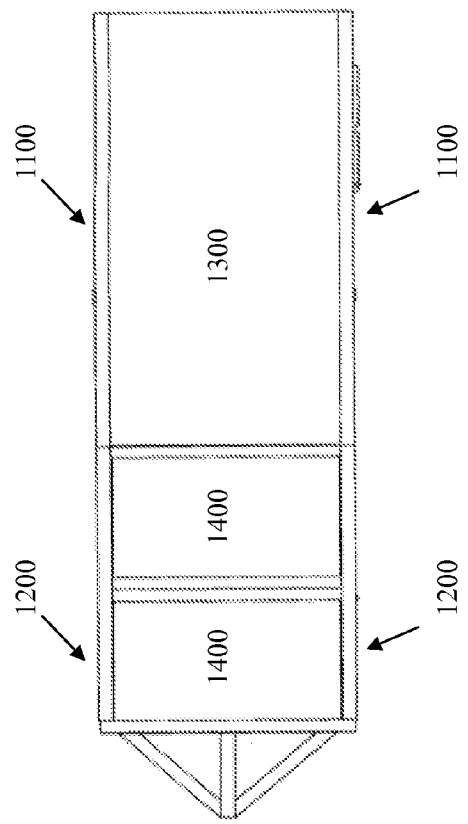
FIG. 1B is a top view of an exemplary embodiment of a machine 1000 in an extended arrangement.
Figure 1D:
FIG. 1D is a side view of an exemplary embodiment of a machine 1000 in an extended arrangement.
Figure 1C:
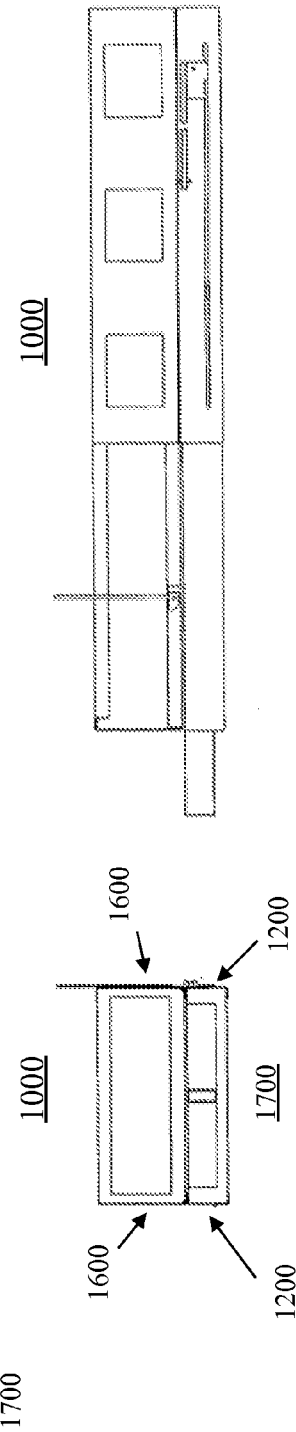
FIG. 1C is a front view of an exemplary embodiment of a machine 1000 in an extended arrangement.
Figure 1F:
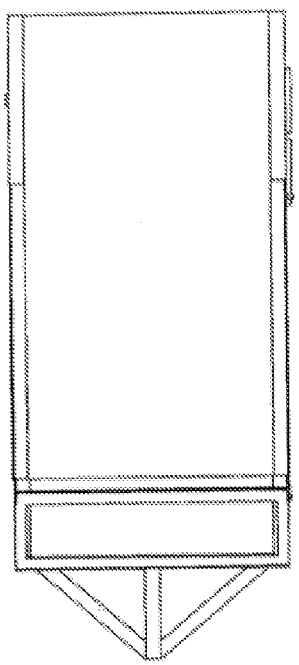
FIG. 1F is a top view of an exemplary embodiment of a machine 1000 in a compressed arrangement.
Figure 1H:
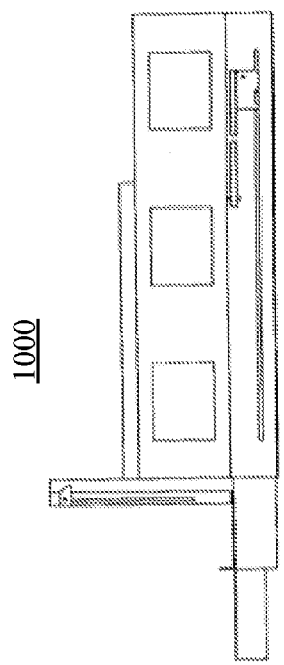
FIG. 1H is a side view of an exemplary embodiment of a machine 1000 in a compressed arrangement.
Figure 1G:
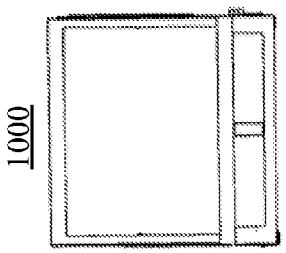
FIG. 1G is a front view of an exemplary embodiment of a machine 1000 in a compressed arrangement.
Figure 1E:
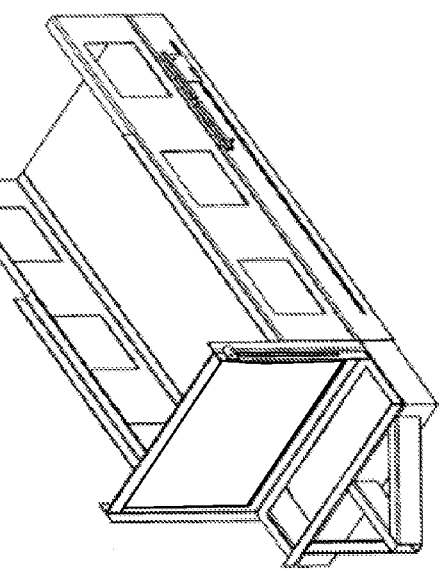
FIG. 1E is a perspective view of an exemplary embodiment of a machine 1000 in a compressed arrangement.

Certain exemplary embodiments can provide a system, machine, device, manufacture, configured for, relating to, and/or resulting from, and/or a method for activities that can comprise and/or relate to, extending a floor, such as a floor of deck, patio, platform, and/or a vehicle, such as a trailer and/or truck from a compressed arrangement to an extended arrangement.

Certain exemplary embodiments can provide systems, devices, and/or methods for managing the length of a trailer, such as a gooseneck trailer, a bumper pull trailer, and/or a fifth wheel, etc.

As shown in the attached figures, certain exemplary embodiments can provide a trailer that is configured to have an extendable length. A substantial portion of the extension mechanism can be located at or near the front of the trailer.

Via certain exemplary embodiments, extension of the trailer can be accomplished by unfolding two or more folded flooring modules of a foldable floor assembly. The foldable floor assembly can be located at or near the front of the trailer. The foldable floor assembly can be structurally supported by, and/or can bear on, one or more substantially horizontally-extending folding floor support assemblies that can be configured to extend in a direction substantially parallel to the length of the trailer.

In certain exemplary embodiments, unfolding of the foldable floor assembly can be assisted by engagement with a gravity-returned operating cam. For example, an un-folding of the foldable floor assembly can be initiated by a nudge provided from a partial rotation a manually operated cam. The foldable floor assembly can expand to form a floor of approximately 2 feet to approximately 20 feet (including all values and sub-ranges therebetween), such as approximately 8 feet in length. The foldable floor assembly can fold at regular and/or irregular intervals, such as into two four foot half-sections (the flooring modules) connected to each other via a common center hinge, and/or connected to the trailer via a single head hinge. For example, the foldable floor assembly can comprise two 4'×8'×3/16" (or 1/4" or 1/8" depending on, e.g., load) diamond plate steel floor plates.

Each hinge can be fabricated of 2" schedule 40 pipe with 2" slot welded slugs, and a common arrangement hinge at the head of the folding assembly. The front-most plate can tethered to the main trailer bed by 3/16" or 1/4" gauge chain. Each hinge can be welded to the backside of the plates. Each hinge can be greasable with a thread-in grease fitting.

The folded flooring modules can be mechanically connected to one another and/or to a stationary portion of the trailer floor (e.g., the folding floor support assemblies) via one or more hinges. The foldable floor assembly can be tethered to the main trailer bed, potentially by chain that can be used to pull its folded flooring modules into a substantially open, flat, and/or horizontal position. The opening process can involve using the trailer braking system to substantially anchor the rear portion of the trailer while the tractor or motorized vehicle attached to the trailer pulls the front of the trailer forward, thereby providing a lengthening or extending force to the trailer.

Alternatively, or in addition, the foldable floor assembly can be extended and/or opened via positioning one or more wheel chock in front of one or more of the trailer wheels, thereby preventing those wheels from easily rotating forward, while pulling the trailer hitch forward, thereby pulling the front of the trailer with respect to the back of the trailer and/or pulling an first floor support (potentially connected to the trailer hitch) with respect to a second floor support (potentially connected to the wheel). When compressing the foldable floor assembly, the one or more wheel chocks can be relocated to behind the one or more wheels, thereby providing rolling resistance to those wheels while the hitch is pushed toward those wheels.

Alternatively, or in addition, the foldable floor assembly can be extended and/or opened via a more localized actuation system, which can rely on any known mechanism configured for extending length, e.g., a linear actuator, such as a screw, wheel and axle (e.g., hoist, winch, rack and pinion, chain drive, belt drive, etc.), articulating arm, cam and follower, hydraulic and/or pneumatic piston/cylinder, etc. The linear actuator can be manual and/or powered, such as via a hand crank, rotary and/or linear motor, hydraulic pump, pneumatic compressor, moving coil, etc.

When the foldable floor assembly is not in an extended orientation, it can be folded into and/or retained in a substantially upright and/or vertical folded orientation. The retention of the foldable floor assembly in the substantially upright orientation can be accomplished by any suitable approach, such as via one or more retention pins, locks, hasps, hooks, latches, magnets, etc. For example, the foldable floor assembly can be retained in the substantially upright orientation by two 1" inch spring returning retaining pins.

Certain exemplary embodiments of the folding floor support assembly(ies) can comprise two or more nested tubes or tube-like structures, where at least one tube can slide lengthwise with respect to another. In longitudinal cross-section, the tubes can have an inner or outer perimeter of any desired shape. For example, any of the tubes can have a substantially longitudinal cross-section that is substantially rectangular, square, oblong, ellipsoidal, round, D-shaped, etc., in its outer perimeter and/or inner perimeter.

The support assemblies need not comprise closed polygons. For example, two or more support assembles can interact and/or interconnect via interlocked members having a longitudinal cross-section that is C-shaped, L-shaped, V-shaped, T-shaped, I-shaped, etc. For example, one or more rectangular members can be partially enclosed by a C-shaped outer member. As another example, one V-shaped member can rest and/or bear upon another. As yet another example, a square tube can have a slot cut in it through which the web of a T-shaped member extends and the cap, top, or flange of the T moves within the hollow of the tube. The width of the slot can be less than the width of the flange, thereby slideably interlocking the flange within the tube.

Thus, the two or more support members need not be of similar shape. That is, one member can be scaled-up in one or more dimensions with respect to another. Moreover, regardless of dimensions, one member can have a substantially different longitudinal cross-sectional shape than another. The two or more support members need not be of equal length.

The support members can be utilized with trailers having an extended length of from approximately 4 feet to approximately 60 feet (including all values and sub-ranges therebetween) and with a foldable floor assembly that can add from approximately 2 feet to approximately 20 feet (including all values and sub-ranges therebetween) to the length of the un-extended trailer. The interface between any two support members can be greased to reduce friction created when one tube slides with respect to the other.

The dimensions and/or materials of the support assemblies can be varied to suit the anticipated use, expected loads, and/or extended length of the trailer.

One or more outer support members can comprise a slot, groove, and/or channel extending into and/or through one or more of its sidewalls, the channel extending all or a portion of the length of an outer support member, such as from approximately 10 percent to approximately 100 percent (including all values and sub-ranges therebetween) of the length of an outer support member, the channel starting at one end or inset by a predetermined amount. Through and/or into the channel can extend a fin, blade, or web of an inner support member, the fin extending from approximately 10 percent to approximately 100 percent (including all values and sub-ranges therebetween) of the length of the inner support member.

The fin/channel assembly can be configured to limit a travel of an inner support member with respect to an outer support member. For example, assume two nested tubes, the outer tube having a substantially identical, rectangular longitudinal cross-section to the inner tube, except the cross-section of the outer tube is enlarged with respect to the inner tube such that the inner tube can achieve a running and/or relatively easily slideable fit within the other. Assume the outer tube is 30 feet long and the inner tube is 20 feet long. Assume the outer tube has a slot extending completely through one of its sidewalls and longitudinally extending for 12 feet along that tube beginning approximately 2 feet from the front end of that tube. Assume the inner tube has a longitudinally extending 10 foot long fin that extends perpendicularly from one sidewall, begins approximately 2 feet from the front end of that tube, and is aligned to extend completely through the slot of the outer tube. By virtue of the slot not extending to either end of the outer tube, the fin of the inner tube can be "trapped" within that slot, thereby preventing and/or resisting the inner tube from escaping or being pulled free from the outer tube (and vice versa), yet allowing the inner tube to relatively easily slide within the constraints imposed by the outer tube.

In certain exemplary embodiments, two nested rectangular tubes can be formed from hot rolled structural steel having ⅜" wall thickness. The inside rectangular tube can have a ½"×12" or 24"×½" fin or blade passing through a laser or plasma cut slot cut in a ¼"×8", 10", or 12" tube to 15" at 5/16 gauge. The slot can match the length of the tube so that the inner tube can be inserted into the outer tube from the back of the trailer. The inner tube can be cut longer than the outer tube to accept the welding of a gooseneck towing support frame.

A dust and/or road shield can be installed over the slot to help prevent debris from entering the slot and/or interfering with the free sliding of the support members relative to each other.

The support member assembly can be assembled in a welding jig as a five piece assembly, with a gap set between all the pieces of approximately 0.00015 to approximately 0.00025 thousands of an inch for weld shrinkage. The assembly can be tacked together in a specific pattern and welded with a pattern to control shrinkage and/or provide substantially uniform straightness.

Certain exemplary embodiments can provide systems, devices, and/or methods for managing the length and/or area of a floor, such as a deck, patio, and/or platform, and/or such as found on a vehicle, such as a gooseneck trailer, bumper pull trailer, fifth wheel, panel truck, and/or van, etc.

FIGS. 1A-D show a perspective, top, front, and side view, respectively, of an exemplary embodiment of a machine 1000 in an extended arrangement. FIGS. 1E-H show a perspective, top, front, and side view, respectively, of an exemplary embodiment of a machine 1000 in a compressed arrangement. Although resembling a portion of a bumper-pull trailer, more generally exemplary machines can be any vehicle, such as a gooseneck trailer, bumper pull trailer, fifth wheel, panel truck, and/or van, etc., and even more generally can be any extendable floor, such as a deck, patio, and/or platform, etc.

As shown, machine 1000 can comprise one or more elongated and substantially "fixed" floor supports 1100, one or more elongated and extendable floor supports 1200, one or more substantially "fixed" floors 1300, one or more extendable floors 1400, one or more substantially "fixed" rails 1500, one or more extendable rails 1600, and/or a hitch assembly 1700. Although not shown, machine 1000 can comprise one or more wheels, the rotation of which substantially define a travel direction of machine 1000. In the context of this application, the phrase "fixed" refers to an element that, when in its intended use, does not substantially move, such as in the travel direction, with respect to another element, such as an axis of rotation of one or more of the wheels.

FIG. 2A is a side view of an exemplary embodiment of a machine 2000 in an extended arrangement, and FIG. 2B is a side view of an exemplary embodiment of a machine 2000 in a compressed arrangement.

As shown, machine 2000 can comprise an elongated substantially "fixed" floor support 2100, an elongated extendable floor support 2200, a substantially "fixed" floor 2300, an extendable floor 2400 assembly, and/or a hitch assembly 2700. As shown, machine 2000 can comprise one or more wheels 2800, the rotation of which substantially define a travel direction of machine 2000. Extendable floor assembly 2400 can comprise flooring modules 2420, 2440 that are connected to each other via a hinge 2460 and/or connected to extendable floor support 2200 via a hinge 2480. Protrusion 2220 can protrude from extendable floor support 2200 and through and be trapped by an elongated slot 2120 defined in fixed floor support 2100. As extendable floor support 2200 moves and extends relative to fixed floor support 2100, protrusion can slide along slot 2120, potentially between a fully compressed slot terminus 2130 and a fully extended slot terminus 2140.

Figure 3:
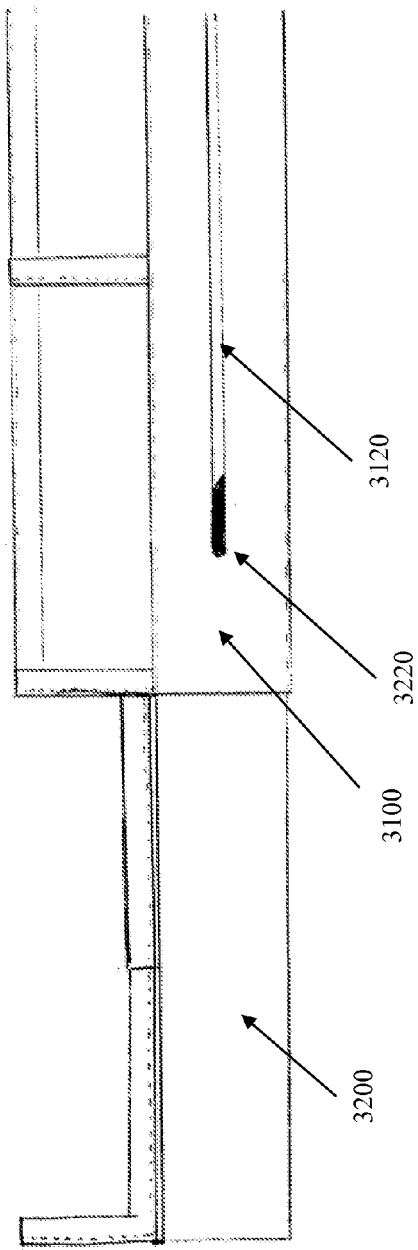
FIG. 3 is a side view of an exemplary embodiment of a machine 3000 in an extended arrangement.

FIG. 3 is a side view of an exemplary embodiment of a machine 3000 in an extended arrangement. Protrusion 3220 is shown protruding from extendable floor support 3200 and through elongated slot 3120 defined in fixed floor support 3100.

Figure 4:
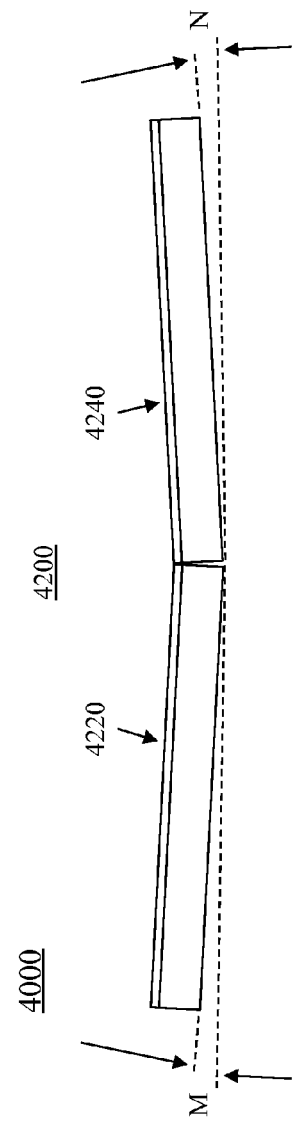
FIG. 4 is a side view of an exemplary embodiment of machine 4000 in an extended arrangement.

FIG. 4 is a side view of an exemplary embodiment of a machine 4000, showing a portion of an extendable flooring module assembly 4200 in an extended arrangement. Flooring module 4220 can connect to flooring module 4240 via a hinge (not shown). Flooring module 4220 can slant and/or be angled at an angle M with respect to horizontal and/or an extendable floor support (not shown). Flooring module 4240 can slant and/or be angled at an angle N with respect to horizontal and/or an extendable floor support (not shown). Angle M can be, but need not be, identical to angle N, and either angle can vary from approximately 0.5 degrees to approximately 5 degrees, including all values (e.g., 1.02, 1.5, 2, 2.3, 2.512, 3, 3.33, 3.999, etc. degrees) and subranges therebetween. Angling flooring modules slightly can help lock them in place in the extended arrangement.

Figure 5:
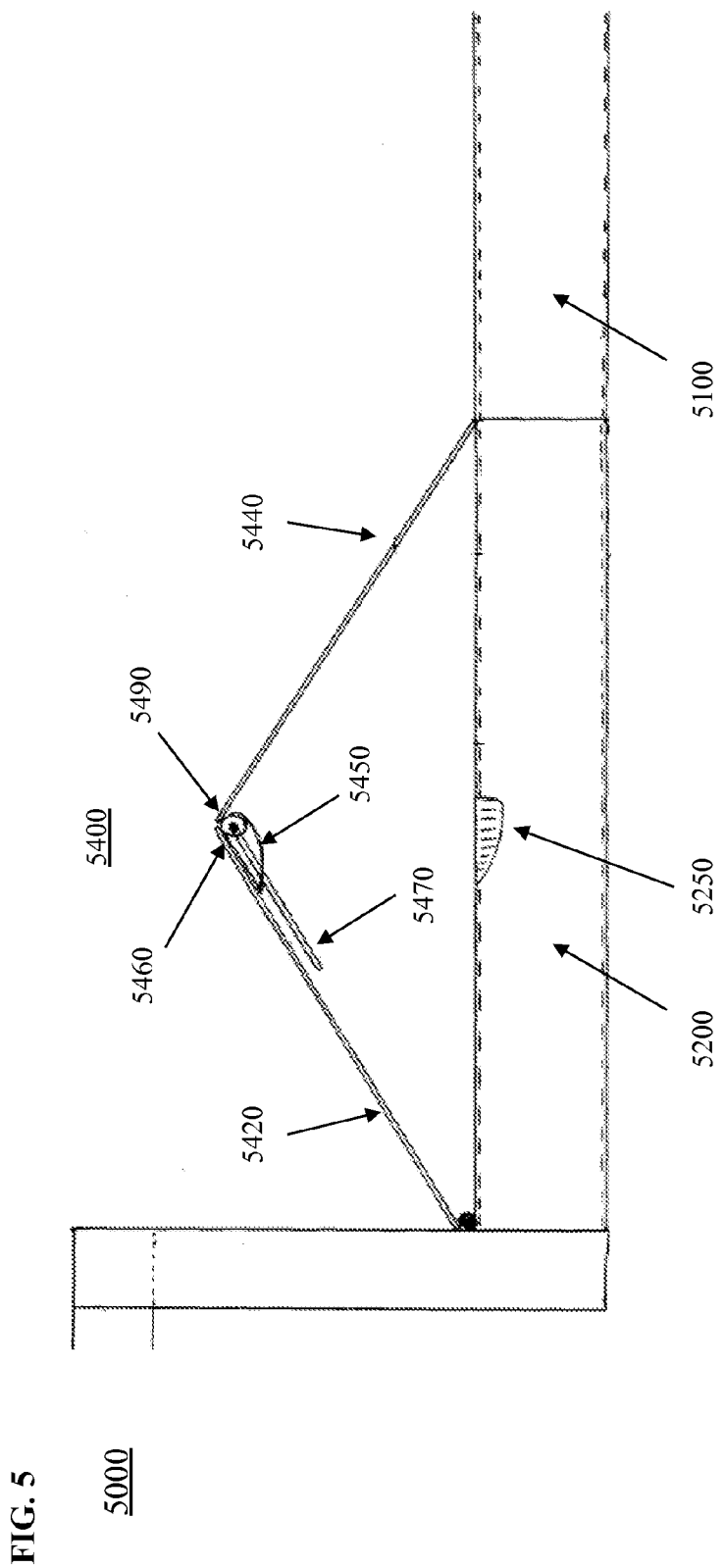
FIG. 5 is a side view of an exemplary embodiment of machine 5000 in between a compressed arrangement and an extended arrangement.

FIG. 5 is a side view of an exemplary embodiment of a machine 5000, showing an extendable flooring module assembly 5400 in a partially extended arrangement (i.e., between an extended arrangement and a compressed arrangement). Flooring module 5420 can connect to flooring module 5440 via a hinge 5460, to a shaft 5490 of which can be connected a cam 5450 and/or a handle 5470. Extendable floor support 5200 is shown partially extended with respect to fixed floor support 5100. A notch and/or cavity 5250 in extendable floor support 5200 can, when extendable flooring module assembly 5400 is in an extended arrangement, accommodate and store cam 5450 and hinge 5460 below a plane defined by floor module 5420 and below a plane defined by floor module 5440. From the extended arrangement, handle 5470 can rotate cam 5450 such that cam 5450 follows a contour bearing against cavity 5250 in a manner that causes shaft 5490 to rise, thereby lifting hinge 5460 and allowing floor module 5420 and 5440 to fold toward each other about hinge 5460 and/or allowing extendable flooring module to fold from an extended arrangement into a compressed arrangement.

FIG. 6 is an end view of an exemplary embodiment of an assembly 6000, which can comprise a first floor support 6100, a second floor support 6200, and a third floor support 6150. Attached to second floor support 6200 can be a protrusion 6120, which can be slideably trapped in a slot in first floor support 6100, thereby potentially allowing second floor support 6200 to slide, move, and/or extend relatively to first floor support 6100. Third floor support 6300 can be rigidly attached to first floor support 6100 or second floor support 6200 or neither. As shown, first floor support 6100 can comprise a unitary C-shaped structural member.

FIG. 7 is an end view of an exemplary embodiment of an assembly 7000, which can comprise a first floor support 7100, a second floor support 7200, and a third floor support 7300. Attached to second floor support 7200 can be a protrusion 7120, which can be slideably trapped in a slot in first floor support 7100, thereby potentially allowing second floor support 7200 to slide, move, and/or extend relatively to first floor support 7100. Third floor support 7300 can be rigidly attached to first floor support 7100 or second floor support 7200 or neither. As shown, first floor support 7100 can comprise a substantially vertical plate that is attached to perpendicular substantially horizontal plates.

FIG. 8 is an end view of an exemplary embodiment of an assembly 8000, which can comprise a first floor support 8100 and a second floor support 8200 nested within first floor support 8100. Attached to second floor support 8200 can be a protrusion 8120, which can be slideably trapped in a slot in first floor support 8100, thereby potentially allowing second floor support 8200 to slide, move, and/or extend relatively to first floor support 8100. As shown, first floor support 8100 can comprise a substantially C-shaped structural member that is attached to a substantially vertical plate.

FIG. 9 is a side view of an exemplary embodiment of an assembly 9000, which can comprise a first floor support 9100 that defines a slot 9120 through which a protrusion 9220 of a second floor support can protrude, be trapped, and/or be slideably received.

FIG. 10A is a side view of an exemplary embodiment of a machine 10000 in between a compressed arrangement and an extended arrangement, and FIG. 10B is a side view of an exemplary embodiment of a machine 10000 in a compressed arrangement. As shown, when transitioning from an extended arrangement to a compressed arrangement, extension railing 10600 can rotate such that it is supported by fixed railing 10500.

FIG. 11 is a side view of an exemplary embodiment of an assembly 11000, which can comprise a first floor support 11100, a second floor support 11200. Attached to second floor support 11200 can be a protrusion 11220, which can be in the shape of a pin, blade, bar, etc., can be attached to extendable floor support 11200, can protrude through slot 11120 in fixed floor support 11100, and/or can be slideably trapped in a slot in first floor support 11100, thereby potentially allowing second floor support 11200 to slide, move, and/or extend relatively to first floor support 11100 in a controlled manner.

Assembly 11000 is shown approaching a compressed arrangement. As shown, as machine 11000 and/or protrusion 11220 approaches the compressed arrangement, protrusion 11220 can press against a latch assembly 11800, which can comprise a rotatable and biased latch 11820 mounted on a latch shaft 11840 (which defines a latch rotational axis) and connected to a torsional spring and a flexible latch handle 11860. In certain exemplary embodiments, latch handle 11860 can comprise a proximal portion 11862 that is configured to be grasped by a user of the handle, a distal portion 11866 that is configured to directly connect to latch 11820, and a flexible portion 11864 that is configured to flexibly join proximal portion 11862 and distal portion 11866. To prevent latch 11820 from inadvertently releasing protrusion 11220, proximal portion 11862 can be configured to be captured between handle restrainer 11870, such as a top pin 11872 and handle bottom pin 11874, thereby restraining and/or limiting movement of handle 11860 and thus latch 11820.

When approaching the compressed arrangement, and as protrusion 11220 presses against the front-most portion of latch 11820, that pressure can overcome the counter-clockwise torsional bias of a torsional and/or helical spring that has a longitudinal axis that is substantially co-incident, parallel to, and/or aligned with a rotational axis of latch 11820 and/or shaft 11840. Thus, the pressure applied by protrusion 11220 pressing against the front-most portion of latch 11820 can lift latch 11820 sufficiently for protrusion 11220 to fit within and, due to the counter-clockwise bias provided by the helical spring, be captured by latch 11820. Because handle 11860 can be flexible, proximal portion 11862 need not be released from handle retaining pins 11872 and/or 11874 for protrusion 11220 to be captured by latch 11820, but instead handle 11860 can flex sufficiently to allow the latch shaft to rotate clockwise when protrusion 11220 applies sufficient force in the rearward direction against latch 11820.

To release machine 11000, protrusion 11220, and/or latch 11820 from the compressed arrangement, the proximal portion 11862 of flexible latch handle 11860 can be moved away from first floor support member 11100, thereby flexing flexible portion 11864 of handle 11860 and allowing proximal portion 11862 of handle 11860 to slide over and/or around handle top pin 11870, thereby allowing handle 11860 to rotate about latch rotational axis clockwise to rotate and lift the front portion of latch 11820 so that protrusion 11220 is released from latch 11820 and can freely slide in slot 11120. A latch rotation stop 11880 can prevent latch 11820 from rotating clock-wise beyond a predetermined limit.

FIG. 12A is a side view of an exemplary embodiment of a latch assembly 12000, which can comprise a handle 12100 having a proximal portion 12200 that is configured to be operably grasped by a user of latch assembly 12000, a distal portion 12400 that is configured to apply a torque and or moment about a rotational axis of a latch shaft 12500, and thereby against latch 12600, and a flexible portion 12300 that flexibly connects proximal portion 12200 and distal portion 12400. Note that, as shown, latch 12400 is configured to capture a protrusion that has a blade-like and/or bar-like configuration.

FIG. 12B is an end view of an exemplary embodiment of a handle 12100, showing how flexible portion 12300 can be formed from, e.g., a hose and/or helical spring and can connect a proximal portion 12200, such as, e.g., a tube having a square and/or circular longitudinal cross-section, to a distal portion 12400, which can have a structure that is similar to or different from that of proximal portion 12200.

FIG. 13 is a side view of an exemplary embodiment of a latch 13000 that is configured to capture a protrusion having a pin-like configuration.

FIG. 14A is a side view of an exemplary embodiment of a machine 14000 in a compressed arrangement. Machine 14000 can comprise one or more first floor support members 14100, one or more second floor support members 14200, one or more third floor support members 14300, an extendable flooring assembly 14400, and/or a vehicle 14500 from which extendable flooring assembly can fold and/or extend, such as from a side, back, and/or front of vehicle 14500.

FIG. 14B is an end view of an exemplary embodiment of machine 14000 in a compressed arrangement, and showing that extendable flooring assembly 14400 can fold-up very close to vehicle 14500.

FIG. 14C is an end view of an exemplary embodiment of machine 14000 in an extended arrangement, and showing that second floor support 14200 can extend away from vehicle 14500 and/or be supported by third floor support 14300.

Certain exemplary embodiments can provide a machine comprising:
  a flooring system operably configured to extend, in an extension direction that is substantially parallel to a plane that defines a forward travel direction of a wheeled vehicle to which the flooring system is configured to be operably attached, from a compressed arrangement to an extended arrangement, the vehicle comprising a least one wheel operably configured to convey the vehicle in the forward travel direction, the flooring system comprising:
    a first plurality of flooring modules that are operably configured to be hingeably connected to each other; and/or
    a floor support assembly operably configured to support the first foldable plurality of flooring modules, the floor support assembly comprising:
      an elongated first floor support that is operably configured to substantially extend in the extension direction relative to the wheel;
      an elongated second floor support operably configured to substantially surround a portion of the first floor support; and/or
      a protrusion operably configured to:
        protrude from the first floor support;
        be slideably received in an elongated slot in the second floor support; and/or
        define, in combination with the slot, an extent of movement, in the extension direction, of the first floor support relative to the second floor support;
  wherein:
    the machine comprises the vehicle;

the vehicle is a trailer;

the vehicle is a truck;

the vehicle is a motor vehicle;

the machine comprises a non-folding floor that is operably configured to be supported by the second floor support;

the second floor support is operably configured to not substantially move in the extension direction relative to the wheel;

the slot defines a length that is operably configured to be aligned substantially parallel to the extension direction;

the slot is operably configured to be closed;

the protrusion is operably configured to be trapped within the slot;

when the flooring system is in the compressed arrangement, a planar top surface of each of the plurality of flooring modules is operably configured to be oriented substantially perpendicularly with respect to the extension direction;

when the flooring system is in the extended arrangement, the first plurality of flooring modules are operably configured to fold about one or more axes that are oriented substantially perpendicularly to the extension direction;

when the flooring system is in the extended arrangement, the first plurality of flooring modules are operably configured to fold about one or more hinges, each of said one or more hinges having an axis of rotation oriented substantially perpendicularly to the extension direction, each of said one or more hinges having an axis of rotation located below a plane defined by a top surface of any flooring module from the plurality of flooring modules;

when the flooring system is in the extended arrangement, a substantially planar top surface of each of the plurality of flooring modules is operably configured to be non-parallel to the extension direction;

when the flooring system is in the extended arrangement, a substantially planar top surface of each of the plurality of flooring modules is operably configured to be angled with respect to the extension direction;

when the flooring system is in the extended arrangement, a substantially planar top surface of each of the plurality of flooring modules is operably configured to be angled by approximately 1 degrees to approximately 3 degrees with respect to the extension direction;

the machine comprises a floor module release cam-follower assembly that is operably configured, when the flooring system is in the extended arrangement, to raise an axis of a hinge above a plane defined by the extension direction, the hinge operably configured to hingeably connect two floor modules from the plurality of floor modules;

the floor support assembly comprises an elongated third floor support operably configured to move, in the extension direction, relative to the second floor support;

the flooring system comprises a second foldable plurality of flooring modules operably configured to be supported by the floor support assembly;

the machine comprises a protrusion latch operably configured to selectively prevent movement of the protrusion, in the extension direction, within the slot;

the machine comprises a rotatable protrusion latch that is operably configured to selectively prevent movement of the protrusion, in the extension direction, within the slot;

the machine comprises a protrusion latch that is operably configured to prevent movement of the protrusion, in the extension direction, within the slot, the protrusion latch operably configured to be released via cam connected to a substantially flexible handle; and/or the machine comprises a protrusion latch operably configured to prevent movement of the protrusion, in the extension direction, within the slot, the protrusion latch operably configured to be released via a cam connected to a substantially flexible handle that comprises a first rigid tube coupled via a flexible hose to a second rigid tube, the flexible hose substantially surrounded by a spring.

DEFINITIONS

When the following terms are used substantively herein, the accompanying definitions apply. These terms and definitions are presented without prejudice, and, consistent with the application, the right to redefine these terms via amendment during the prosecution of this application or any application claiming priority hereto is reserved. For the purpose of interpreting a claim of any patent that claims priority hereto, each definition in that patent functions as a clear and unambiguous disavowal of the subject matter outside of that definition.

a—at least one.

about—around and/or approximately.

above—at a higher level.

across—from one side to another.

activity—an action, act, step, and/or process or portion thereof.

adapt—to design, make, set up, arrange, shape, configure, and/or make suitable and/or fit for a specific purpose, function, use, and/or situation.

adapter—a device used to effect operable compatibility between different parts of one or more pieces of an apparatus or system.

after—following in time and/or subsequent to.

align—to adjust substantially into a proper orientation and location with respect to another thing.

along—through, on, beside, over, in line with, and/or parallel to the length and/or direction of; and/or from one end to the other of.

an—at least one.

and—in conjunction with.

and/or—either in conjunction with or in alternative to.

angled—slanted with respect to an adjacent object and/or reference plane.

any—one, some, every, and/or all without specification.

apparatus—an appliance or device for a particular purpose.

approximately—about and/or nearly the same as.

are—to exist.

around—about, surrounding, and/or on substantially all sides of; and/or approximately.

arrangement—a temporal and/or spatial ordering of things.

as long as—if and/or since.

assembly—a plurality of coupled components.

associate—to join, connect together, and/or relate.

at—in, on, and/or near.

at least—not less than, and possibly more than.

at least one—not less than one, and possibly more than one.

attached—connected, joined, and/or secured together.

axis—a straight line about which a body and/or geometric object rotates and/or can be conceived to rotate and/or a center line to which parts of a structure and/or body can be referred.

be—to exist in actuality.

below—beneath; in a lower place; and/or less than.

between—in a separating interval and/or intermediate to.

by—via and/or with the use and/or help of cam-follower assembly—a combination of a rotatable, pivotal, and/or rockable cam and an adjacent follower that makes sliding contact with the cam during relative cam-follower movement between the cam and follower at each cam-follower contact point along a contour, the contour not uniformly concentric with the pivotal or rotational axis of the cam, the relative cam-follower movement imparting a relative contour-axis movement between the contour and the axis, the relative contour-axis movement prescribed by the configuration of the contour with respect to the axis and measurable along a line that is normal to the axis and passes through the corresponding current cam-follower contact point.

can—is capable of, in at least some embodiments.

cause—to bring about, provoke, precipitate, produce, elicit, be the reason for, result in, and/or effect.

circuit—an electrically conductive pathway and/or a communications connection established across two or more switching devices comprised by a network and between corresponding end systems connected to, but not comprised by the network.

closed—the result of closing, having boundaries, and/or enclosed.

combination—an ordered arrangement of two or more entities.

composition of matter—a combination, reaction product, compound, mixture, formulation, material, and/or composite formed by a human and/or automation from two or more substances and/or elements.

compress—to transform to a smaller and/or shortened form.

comprising—including but not limited to.

configure—to design, arrange, set up, shape, and/or make suitable and/or fit for a specific purpose, function, use, and/or situation.

connect—to physically join, link, couple, and/or fasten two or more entities.

containing—including but not limited to.

convert—to transform, adapt, and/or change.

convey—to transmit, transport, guide, and/or carry.

corresponding—related, associated, accompanying, similar in purpose and/or position, conforming in every respect, and/or equivalent and/or agreeing in amount, quantity, magnitude, quality, and/or degree.

couple—to join, connect, and/or link two things together.

coupleable—capable of being joined, connected, and/or linked together.

create—to bring into being.

define—to establish the meaning, relationship, outline, form, and/or structure of and/or to precisely and/or distinctly describe and/or specify.

degree—a measure of arcs and plane angles and representing $1/360$ of a full rotation.

derive—to receive, obtain, and/or produce from a source and/or origin.

determine—to find out, obtain, calculate, decide, deduce, ascertain, and/or come to a decision, typically by investigation, reasoning, and/or calculation.

device—a machine, manufacture, and/or collection thereof.

direction—a spatial relation between something and a course along which it points and/or moves; a distance independent relationship between two points in space that specifies the position of either with respect to the other; and/or a relationship by which the alignment and/or orientation of any position with respect to any other position is established.

each—every one of a group considered individually.

effective—sufficient to bring about, provoke, elicit, and/or cause.

embodiment—an implementation, manifestation, and/or concrete representation.

estimate—(n) a calculated value approximating an actual value; (v) to calculate and/or determine approximately and/or tentatively.

exemplary—serving as an example, instance, and/or illustration.

extend—to expand, reach spatially outward, stretch, and/or cause to be longer or cover more area.

extension—that which increases the length, area, and/or volume of something, is configured to increase in length, area, and/or volume, or is the result of an increase in length, area, and/or volume.

extent—a breadth of first—an initial entity in an ordering of entities and/or immediately preceding the second in an ordering.

flexible—capable of bending without a tendency to break.

flooring system—a structure, potentially comprised by a deck, platform, etc., that defines a substantially horizontally-spanning surface that is operably configured for supporting a plurality of people.

fold—to bend.

foldable—configured to be bent, such as about a predetermined axis.

for—with a purpose of forward—to go to and/or toward a subsequent destination and/or address.

from—used to indicate a source, origin, and/or location thereof.

further—in addition.

generate—to create, produce, give rise to, and/or bring into existence.

given— handle—a part and/or element adapted to be held, seized, grasped, and/or receive an applied force.

having—possessing, characterized by, comprising, and/or including, but not limited to.

hinge—a movable joint used to fasten two things together and to allow at least one of them to pivot relative to the other.

hose—a flexible tube for conveying a liquid, as water, to a desired point.

including—including but not limited to.

initialize—to prepare something for use and/or some future event.

install—to connect or set in position and prepare for use.

into—to a condition, state, or form of is—to exist in actuality.

latch—(n) that which releasably fastens and/or holds; (v) to releasably fasten and/or hold length—a longest dimension of something and/or the measurement of the extent of something along its greatest dimension.
located—situated in a particular spot, region, and/or position.
machine—(n) a device and/or assembly configured to perform at least one task. (v) to cut, shape, and/or finish via a machine.
may—is allowed and/or permitted to, in at least some embodiments.
method—one or more acts that are performed upon subject matter to be transformed to a different state or thing and/or are tied to a particular apparatus, said one or more acts not a fundamental principal and not pre-empting all uses of a fundamental principal.
module—an assembly and/or device.
more—a quantifier meaning greater in size, amount, extent, and/or degree.
motor—a device that converts electrical energy and/or chemical energy into mechanical energy that produces and/or imparts linear and/or angular motion.
move—to change a position and/or place.
movement—a change in place and/or position from one location to another.
near—a distance of less than approximately [X].
no—an absence of and/or lacking any.
not—a negation of something; in no way.
one—being and/or amounting to a single unit, individual, and/or entire thing, item, and/or object.
one—being or amounting to a single unit, individual, and/or entire thing, item, and/or object.
operably configured—when put into the use and/or service for which designed and constructed.
or—a conjunction used to indicate alternatives, typically appearing only before the last item in a group of alternative items.
orient—to position a first object relative to a second object.
other—a different and/or distinct entity and/or not the same as already mentioned and/or implied.
outside—beyond a range, boundary, and/or limit; and/or not within.
parallel—of, relating to, and/or designating lines, curves, planes, and/or surfaces everywhere equidistant and/or an arrangement of components in an electrical circuit that splits an electrical current into two or more paths.
per—for each and/or by means of.
perpendicular—intersecting at and/or forming substantially right angles.
planar—shaped as a plane.
plane—a substantially flat surface and/or a surface containing all the straight lines that connect any two points on it.
plurality—the state of being plural and/or more than one.
portion—a part, component, section, percentage, ratio, and/or quantity that is less than a larger whole.
pre-—a prefix that precedes an activity that has occurred beforehand and/or in advance.
predetermine—to determine, decide, and/or establish in advance.
prevent—to impede, resist, hinder, stop, and/or keep from happening.
prior—before and/or preceding in time or order.
probability—a quantitative representation of a likelihood of an occurrence.
product—something produced by human and/or mechanical effort.
project—to calculate, estimate, or predict.
protrude—to bulge, jut, project, and/or extend out and/or into space and/or beyond a predetermined threshold and/or surface.
protrusion—something that protrudes and/or projects from an object and/or a surface.
provide—to furnish, supply, give, and/or make available.
raise—to move to a higher position and/or elevate.
range—a measure of an extent of a set of values and/or an amount and/or extent of variation.
ratio—a relationship between two quantities expressed as a quotient of one divided by the other.
receive—to gather, take, acquire, obtain, accept, get, and/or have bestowed upon.
recommend—to suggest, praise, commend, and/or endorse.
reduce—to make and/or become lesser and/or smaller.
relative—considered with reference to and/or in comparison to something else.
release—to let go and/or free from something that restrains, binds, fastens, and/or holds back.
remove—to eliminate, remove, and/or delete, and/or to move from a place or position occupied.
repeat—to do again and/or perform again.
repeatedly—again and again; repetitively.
request—to express a desire for and/or ask for.
result—(n.) an outcome and/or consequence of a particular action, operation, and/or course; (v.) to cause an outcome and/or consequence of a particular action, operation, and/or course.
rigid—substantially inflexible.
rotatable—capable of rotating.
rotation—an act and/or process of turning around a center and/or an axis.
said—when used in a system or device claim, an article indicating a subsequent claim term that has been previously introduced.
second—being immediately after a first item in an exemplary ordering and/or an element following a first element in a set.
select—to make a choice or selection from alternatives.
selectively—via choice.
set—a related plurality.
slideably—a smooth and/or continuous motion of one object relative to another.
slot—a narrow opening and/or aperture; and/or an opening having a longer length than a width of the opening.
species—a class of individuals and/or objects grouped by virtue of their common attributes and assigned a common name; a division subordinate to a genus.
spring—a flexible elastic object, such as a coil of wire, bent bar, coupled set of plates, washer, etc., that regains its original shape after being compressed or extended, is used to store mechanical energy, and is often made of hardened and tempered material, such as steel. Types of springs can include coil springs, helical springs, conical springs, torsion springs, tension springs, compression springs, leaf springs, V-springs, spiral springs, spring washers, gas springs, rubber bands, etc.
store—to place, hold, and/or retain data, typically in a memory.
substantially—to a great extent and/or degree.
support—to hold, bear, and/or carry the weight and/or mechanical load of, especially from below.
surface—the outer boundary of an object and/or a material layer constituting and/or resembling such a boundary.

surround—to encircle, enclose, and/or confine on several and/or all sides.

system—a collection of mechanisms, devices, machines, articles of manufacture, processes, data, and/or instructions, the collection designed to perform one or more specific functions.

that—a pronoun used to indicate a thing as indicated, mentioned before, present, and/or well known.

third—a cited element of a set that follows a second element.

through—across, among, between, and/or in one side and out the opposite and/or another side of to—a preposition adapted for use for expressing purpose.

top—an uppermost point and/or above relative to a predetermined orientation of an object.

trailer—a non-motorized vehicle designed to be pulled behind a motor vehicle, transform—to change in measurable: form, appearance, nature, and/or character.

transmit—to send as a signal, provide, furnish, and/or supply.

trap—to prevent from escaping and/or getting free.

travel—to go and/or appear to go from one place to another; and/or to pass and/or be transmitted.

treatment—an act, manner, or method of handling and/or dealing with someone and/or something.

truck—a motorized vehicle configured for carrying and/or pulling a load.

tube—an elongate member having a longitudinal axis and defining a longitudinal cross-section resembling any substantially closed shape such as, for example, a circle, a non-circle such as an oval (which generally can include a shape that is substantially in the form of an obround, ellipse, limacon, cardioid, cartesian oval, and/or Cassini oval, etc), and/or a polygon such as a triangle, rectangle, square, parallelogram, rhomboid, pentagon, hexagon, the shape of the letter "D", the shape of the letter "P", etc. Thus, a right circular cylinder is one form of a tube, an elliptic cylinder is another form of a tube having an elliptical longitudinal cross-section, and a generalized cylinder is yet another form of a tube.

two—a cardinal number equal to one plus one.

upon—immediately or very soon after; and/or on the occasion of.

use—to put into service.

vehicle—any type of mobile transport, such as a car, motorcycle, truck, trailer, wagon, half-track, train, boat, ship, airplane, helicopter, scooter, bicycle, ATV, unmanned vehicle, robot, etc.

via—by way of, with, and/or utilizing.

weight—a force with which a body is attracted to Earth or another celestial body, equal to the product of the object's mass and the acceleration of gravity; and/or a factor and/or value assigned to a number in a computation, such as in determining an average, to make the number's effect on the computation reflect its importance, significance, preference, impact, etc.

wheel—a solid disk, hub, or rigid circular ring connected by spokes to a hub, and designed to turn around an axle passed through the center.

wheeled—having at least one operable wheel.

when—at a time and/or during the time at which.

wherein—in regard to which; and; and/or in addition to.

which—a pronoun adapted to be used in clauses to represent a specified antecedent.

with—accompanied by.

with regard to—about, regarding, relative to, and/or in relation to.

with respect to—about, regarding, relative to, and/or in relation to.

within—inside the limits of.

zone—a region and/or volume having at least one predetermined boundary.

Note

Various substantially and specifically practical and useful exemplary embodiments of the claimed subject matter are described herein, textually and/or graphically, including the best mode, if any, known to the inventor(s), for implementing the claimed subject matter by persons having ordinary skill in the art. Any of numerous possible variations (e.g., modifications, augmentations, embellishments, refinements, and/or enhancements, etc.), details (e.g., species, aspects, nuances, and/or elaborations, etc.), and/or equivalents (e.g., substitutions, replacements, combinations, and/or alternatives, etc.) of one or more embodiments described herein might become apparent upon reading this document to a person having ordinary skill in the art, relying upon his/her expertise and/or knowledge of the entirety of the art and without exercising undue experimentation. The inventor(s) expects skilled artisans, after obtaining authorization from the inventor(s), to implement such variations, details, and/or equivalents as appropriate, and the inventor(s) therefore intends for the claimed subject matter to be practiced other than as specifically described herein. Accordingly, as permitted by law, the claimed subject matter includes and covers all variations, details, and equivalents of that claimed subject matter. Moreover, as permitted by law, every combination of the herein described characteristics, functions, activities, substances, and/or structural elements, and all possible variations, details, and equivalents thereof, is encompassed by the claimed subject matter unless otherwise clearly indicated herein, clearly and specifically disclaimed, or otherwise clearly inoperable or contradicted by context.

The use of any and all examples, or exemplary language (e.g., "such as") provided herein, is intended merely to better illuminate one or more embodiments and does not pose a limitation on the scope of any claimed subject matter unless otherwise stated. No language herein should be construed as indicating any non-claimed subject matter as essential to the practice of the claimed subject matter.

Thus, regardless of the content of any portion (e.g., title, field, background, summary, description, abstract, drawing figure, etc.) of this document, unless clearly specified to the contrary, such as via explicit definition, assertion, or argument, or clearly contradicted by context, with respect to any claim, whether of this document and/or any claim of any document claiming priority hereto, and whether originally presented or otherwise:

there is no requirement for the inclusion of any particular described characteristic, function, activity, substance, or structural element, for any particular sequence of activities, for any particular combination of substances, or for any particular interrelationship of elements;

no described characteristic, function, activity, substance, or structural element is "essential";

any two or more described substances can be mixed, combined, reacted, separated, and/or segregated;

any described characteristics, functions, activities, substances, and/or structural elements can be integrated, segregated, and/or duplicated;

any described activity can be performed manually, semi-automatically, and/or automatically;

any described activity can be repeated, any activity can be performed by multiple entities, and/or any activity can be performed in multiple jurisdictions; and any described characteristic, function, activity, substance, and/or structural element can be specifically excluded, the sequence of activities can vary, and/or the interrelationship of structural elements can vary.

The use of the terms "a", "an", "said", "the", and/or similar referents in the context of describing various embodiments (especially in the context of the following claims) are to be construed to cover both the singular and the plural, unless otherwise indicated herein or clearly contradicted by context.

The terms "comprising," "having," "including," and "containing" are to be construed as open-ended terms (i.e., meaning "including, but not limited to,") unless otherwise noted.

When any number or range is described herein, unless clearly stated otherwise, that number or range is approximate. Recitation of ranges of values herein are merely intended to serve as a shorthand method of referring individually to each separate value falling within the range, unless otherwise indicated herein, and each separate value and each separate sub-range defined by such separate values is incorporated into the specification as if it were individually recited herein. For example, if a range of 1 to 10 is described, that range includes all values therebetween, such as for example, 1.1, 2.5, 3.335, 5, 6.179, 8.9999, etc., and includes all sub-ranges therebetween, such as for example, 1 to 3.65, 2.8 to 8.14, 1.93 to 9, etc., even if those specific values or specific sub-ranges are not explicitly stated.

When any phrase (i.e., one or more words) appearing in a claim is followed by a drawing element number, that drawing element number is exemplary and non-limiting on claim scope.

No claim of this document is intended to invoke 35 USC 112 paragraph six (or paragraph f) unless the precise phrase "means for" is followed by a gerund.

Any information in any material (e.g., a United States patent, United States patent application, book, article, web page, etc.) that has been incorporated by reference herein, is incorporated by reference herein in its entirety to its fullest enabling extent permitted by law yet only to the extent that no conflict exists between such information and the other definitions, statements, and/or drawings set forth herein. In the event of such conflict, including a conflict that would render invalid any claim herein or seeking priority hereto, then any such conflicting information in such material is specifically not incorporated by reference herein. Any specific information in any portion of any material that has been incorporated by reference herein that identifies, criticizes, or compares to any prior art is not incorporated by reference herein.

Applicant intends that each claim presented herein and at any point during the prosecution of this application, and in any application that claims priority hereto, defines a distinct patentable invention and that the scope of that invention must change commensurately if and as the scope of that claim changes during its prosecution. Thus, within this document, and during prosecution of any patent application related hereto, any reference to any claimed subject matter is intended to reference the precise language of the then-pending claimed subject matter at that particular point in time only.

Accordingly, every portion (e.g., title, field, background, summary, description, abstract, drawing figure, etc.) of this document, other than the claims themselves and any provided definitions of the phrases used therein, is to be regarded as illustrative in nature, and not as restrictive. The scope of subject matter protected by any claim of any patent that issues based on this document is defined and limited only by the precise language of that claim (and all legal equivalents thereof) and any provided definition of any phrase used in that claim, as informed by the context of this document.

What is claimed is:

1. A machine comprising:
a flooring system operably configured to extend, in an extension direction that is substantially parallel to a plane that defines a forward travel direction of a wheeled vehicle to which the flooring system is configured to be operably attached, from a compressed arrangement to an extended arrangement, the vehicle comprising a least one wheel operably configured to convey the vehicle in the forward travel direction, the flooring system comprising:
a first plurality of flooring modules that are operably configured to be hingeably connected to each other; and
a floor support assembly operably configured to support the first foldable plurality of flooring modules, the floor support assembly comprising:
an elongated first floor support that is operably configured to substantially extend in the extension direction relative to the wheel;
an elongated second floor support operably configured to substantially surround a portion of the first floor support; and
a protrusion operably configured to:
protrude from the first floor support;
be slideably received in an elongated slot in the second floor support; and
define, in combination with the slot, an extent of movement, in the extension direction, of the first floor support relative to the second floor support.

2. The machine of claim 1, wherein:
the machine comprises the vehicle.

3. The machine of claim 1, wherein:
the vehicle is a trailer.

4. The machine of claim 1, wherein:
the vehicle is a truck.

5. The machine of claim 1, wherein:
the vehicle is a motor vehicle.

6. The machine of claim 1, wherein:
the machine comprises a non-folding floor that is operably configured to be supported by the second floor support.

7. The machine of claim 1, wherein:
the second floor support is operably configured to not substantially move in the extension direction relative to the wheel.

8. The machine of claim 1, wherein:
the slot defines a length that is operably configured to be aligned substantially parallel to the extension direction.

9. The machine of claim 1, wherein:
the slot is operably configured to be closed.

10. The machine of claim 1, wherein:
the protrusion is operably configured to be trapped within the slot.

11. The machine of claim 1, wherein:
when the flooring system is in the compressed arrangement, a planar top surface of each of the plurality of flooring modules is operably configured to be oriented substantially perpendicularly with respect to the extension direction.

12. The machine of claim 1, wherein:
when the flooring system is in the extended arrangement, the first plurality of flooring modules are operably configured to fold about one or more axes that are oriented substantially perpendicularly to the extension direction.

13. The machine of claim 1, wherein:
when the flooring system is in the extended arrangement, the first plurality of flooring modules are operably configured to fold about one or more hinges, each of said one or more hinges having an axis of rotation oriented substantially perpendicularly to the extension direction, each of said one or more hinges having an axis of rotation located below a plane defined by a top surface of any flooring module from the plurality of flooring modules.

14. The machine of claim 1, wherein:
when the flooring system is in the extended arrangement, a substantially planar top surface of each of the plurality of flooring modules is operably configured to be non-parallel to the extension direction.

15. The machine of claim 1, wherein:
when the flooring system is in the extended arrangement, a substantially planar top surface of each of the plurality of flooring modules is operably configured to be angled with respect to the extension direction.

16. The machine of claim 1, wherein:
when the flooring system is in the extended arrangement, a substantially planar top surface of each of the plurality of flooring modules is operably configured to be angled by approximately 1 degrees to approximately 3 degrees with respect to the extension direction.

17. The machine of claim 1, wherein:
the machine comprises a floor module release cam-follower assembly that is operably configured, when the flooring system is in the extended arrangement, to raise an axis of a hinge above a plane defined by the extension direction, the hinge operably configured to hingeably connect two floor modules from the plurality of floor modules.

18. The machine of claim 1, wherein:
the floor support assembly comprises an elongated third floor support operably configured to move, in the extension direction, relative to the second floor support.

19. The machine of claim 1, wherein:
the flooring system comprises a second foldable plurality of flooring modules operably configured to be supported by the floor support assembly.

20. The machine of claim 1, wherein:
the machine comprises a protrusion latch operably configured to selectively prevent movement of the protrusion, in the extension direction, within the slot.

21. The machine of claim 1, wherein:
the machine comprises a rotatable protrusion latch that is operably configured to selectively prevent movement of the protrusion, in the extension direction, within the slot.

22. The machine of claim 1, wherein:
the machine comprises a protrusion latch that is operably configured to prevent movement of the protrusion, in the extension direction, within the slot, the protrusion latch operably configured to be released via cam connected to a substantially flexible handle.

23. The machine of claim 1, wherein:
the machine comprises a protrusion latch operably configured to prevent movement of the protrusion, in the extension direction, within the slot, the protrusion latch operably configured to be released via a cam connected to a substantially flexible handle that comprises a first rigid tube coupled via a flexible hose to a second rigid tube, the flexible hose substantially surrounded by a spring.

* * * * *